United States Patent [19]

Scaglione

[11] 3,863,674
[45] Feb. 4, 1975

[54] FLUID FLOW CONTROL VALVE

[76] Inventor: Paul J. Scaglione, 30180 Richmond Hill Dr., Farmington, Mich. 48024

[22] Filed: Sept. 18, 1972

[21] Appl. No.: 290,259

[52] U.S. Cl.......... 137/614.16, 137/468, 137/637.4, 251/160, 251/192, 251/311
[51] Int. Cl............................................ F16k 29/00
[58] Field of Search..... 137/614.16, 614.17, 614.18, 137/614.19, 614.2, 637, 637.1, 637.2, 637.3, 637.4, 637.5, 637.65, 614.21, 468; 251/316, 317, 314, 160, 311, 312, 162, 174, 192, 158, 181

[56] References Cited
UNITED STATES PATENTS

| | | | |
|---|---|---|---|
| 727,205 | 5/1903 | Root et al.................. | 137/614.17 X |
| 859,573 | 7/1907 | McMillan...................... | 251/162 X |
| 915,543 | 3/1909 | Billiard ........................ | 137/614.17 |
| 1,434,267 | 10/1922 | Thibodeaux et al........... | 137/614.17 |
| 1,471,444 | 10/1923 | Brassington.................. | 137/614.17 |
| 1,631,166 | 6/1927 | Sprague ....................... | 251/162 |
| 1,689,296 | 10/1928 | Redding........................ | 137/637.4 |
| 1,841,050 | 1/1932 | O'Stroske .................... | 137/637.5 |
| 1,959,265 | 5/1934 | Durnin........................... | 137/468 X |
| 2,021,427 | 11/1935 | Peo................................ | 137/468 X |
| 2,341,411 | 2/1944 | Ojalvo........................... | 137/614.17 |
| 2,395,470 | 2/1946 | Ewing........................... | 137/614.19 X |
| 2,409,947 | 10/1946 | Mantz........................... | 137/637.1 X |
| 2,529,544 | 11/1950 | Ebert............................. | 251/162 |
| 2,826,921 | 3/1958 | Allen............................. | 251/162 X |
| 3,213,888 | 10/1965 | Cameron et al............ | 137/614.16 X |
| 3,276,739 | 10/1966 | Freed............................. | 251/314 |

*Primary Examiner*—Manuel A. Antonakas
*Assistant Examiner*—Ira S. Lazarus
*Attorney, Agent, or Firm*—Robert G. Mentag

[57] ABSTRACT

A fluid flow control valve having a valve body in which is formed a vertical elongated chamber provided with an inlet passage and an outlet passage. A rotatable valve is operatively mounted within said valve body chamber and is seated within a circular seal to hold said rotatable valve in position in the valve body. The rotatable valve is provided with means for releasably retaining the valve in a locked position when it is rotated to the closed position. The valve includes means operatively connected to the rotatable valve for rotating the rotatable valve between open and closed positions. On some embodiments the rotatable valve is provided with a high-pressure fluid inlet chamber which is divided from a low pressure fluid outlet chamber by a dividing wall provided with a passage therethrough so that high pressure fluid flowing through the rotatable valve enters the inlet passage and passes through the inlet chamber in a rotatable valve and thence out into the outlet chamber and out through the outlet passage in the valve. The passage through the dividing wall is provided with a valve seat and a regulating valve is provided to control the flow of fluid from the rotatable valve inlet chamber into the rotatable valve outlet chamber. The inner surfaces of the rotatable valve direct fluid flow. The rotatable valve outer surface functions to allow flow or stop flow depending on the position of the rotatable valve. In some embodiments, the dividing wall in the rotatable valve is deleted to permit flow directly through the rotatable valve. In other embodiments, the valve includes means to provide a strainer function, a trap function, a check valve function, and a flow switch or flow indicator function. All of the embodiments provide a shut-off function.

7 Claims, 18 Drawing Figures

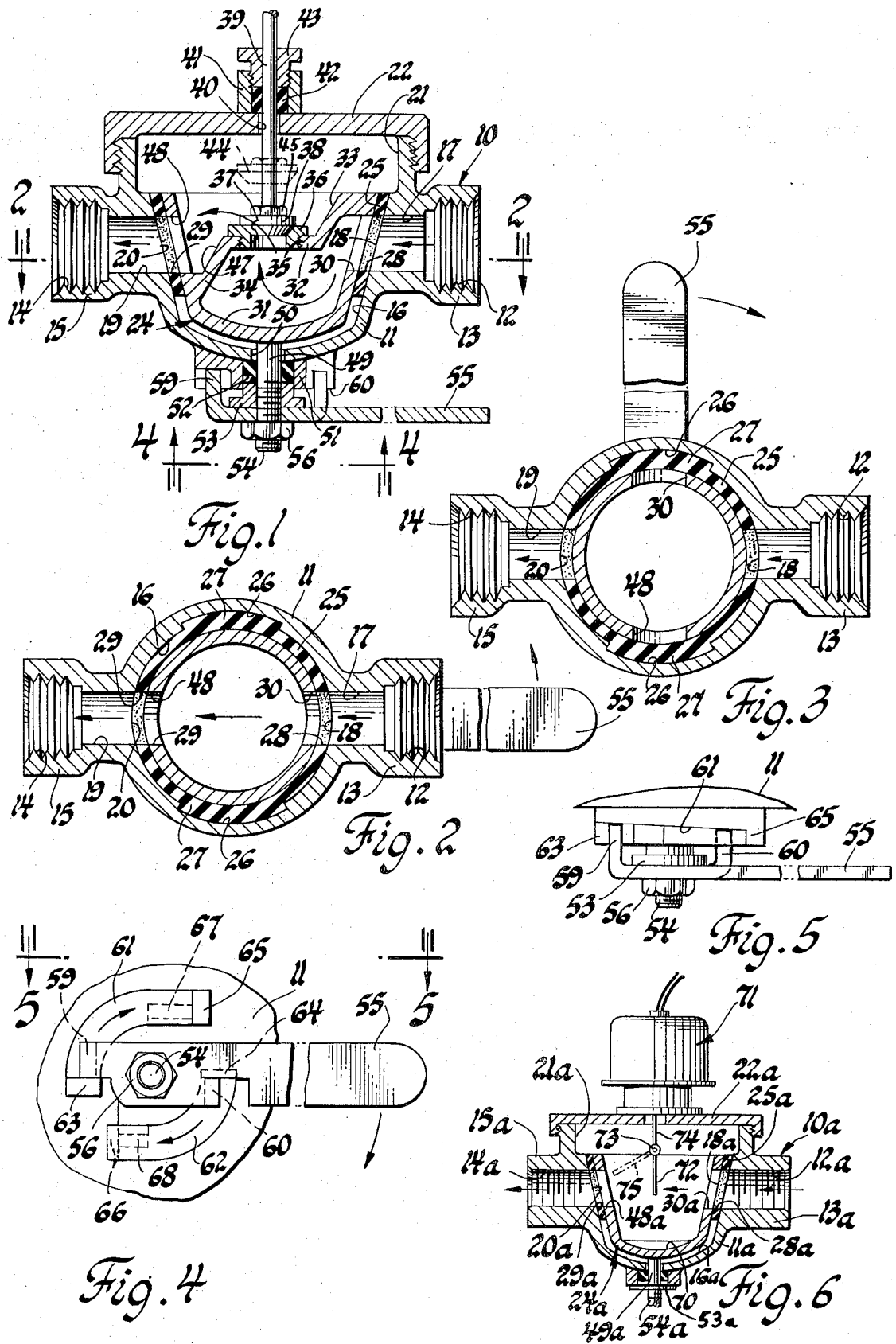

FLUID FLOW CONTROL VALVE

SUMMARY OF THE INVENTION

This invention relates generally to fluid flow control valves, and more particularly, to a fluid flow control valve which can also provide a flow regulating function and other functions together with the fluid flow function.

It is an important object of the present invention to provide a novel and improved fluid flow control valve which is adapted to carry out a plurality of functions, as for example, a fluid flow control function, a pressure temperature regulating function, a fluid cleaning function, a check valve function, or a trap function. Heretofore, in order to provide the required pressure, temperature or trap regulation, it has been common practice to install conventional pressure reducing valves, temperature regulating valves or traps, into what is commonly referred to as a valve station. Prior art valve stations comprise either an upstream shut-off valve, a regulator and a downstream shut-off valve, or an upstream shut-off valve, a strainer, a regulator, and a downstream shut-off valve. Prior art trap stations comprise an upstream shut-off valve, a strainer, the trap valve such as a thermostatic bellows, thermodynamic disc, float or bucket type design, a check valve and a downstream shut-off valve. The upstream and downstream shut-off features are provided to stop fluid flow so that any of the valve features between can be serviced, such as a regulator, a trap, a strainer or check valve. A disadvantage of the prior art valve stations is that they require a large amount of material to form the same, and a great number of hours of labor to install such a station. Another disadvantage of the prior art valve stations is that they require a large amount of space in a fluid flow piping system. Still another disadvantage of the prior art valve stations is that they require much time to shut down and service the same. In view of the foregoing, it is an important object of the present invention to provide a novel and improved fluid flow control valve which overcomes the aforementioned disadvantages of the prior art valve stations.

It is another object of the present invention to provide a novel and improved fluid flow control valve which is adapted to provide the functions of a regulating valve and two shut-off valves in one unitary operating structure.

It is still another object of the present invention to provide a novel and improved fluid flow control valve which is adapted to provide the functions of a regulator valve, a strainer and two shut-off valves in one unitary operating structure.

It is still another object of the present invention to provide a novel and improved fluid flow control valve which is adapted to provide the plural functions of a trap and two shut-off valves in one unitary operating structure.

It is still a further object of the present invention to provide a novel and improved fluid flow control valve which is adapted to provide the plural functions of a trap, two shut-off valves, a strainer or a check valve in one unitary operating structure.

It is still another object of the present invention to provide a novel and improved fluid flow control valve which is adapted to provide the plural functions of a flow switch or flow indicator, and two shut-off valves in one unitary operating structure.

It is still another object of the present invention to provide a novel and improved fluid flow control valve which functions to shut off both upstream and downstream flows through a regulating valve, a trap, a strainer, a check valve, or a flow indicator, and which valve functions by a single 90° turn of an operating handle, as compared to the required two separate operations in the prior art valve stations for closing two shutdown valves in widely spaced apart positions.

It is still another object of the present invention, to provide a novel and improved fluid flow control valve which is simple and compact in construction, easy to install and service, and economical to manufacture.

It is still a further object of the present invention to provide a novel and improved fluid flow control valve which includes a regulating apparatus, a trap apparatus, a strainer apparatus, or a check valve apparatus, and a flow switch or flow indicator apparatus, in a unitary valve body, and wherein each may be removed from the valve body without removing the valve body from a piping system in which it is installed, so as to permit quick and efficient repair and service operations to any one of the regulating apparatus, trap apparatus, strainer apparatus, check valve apparatus, or flow switch of flow indicator apparatus.

It is still another object of the present invention to provide a fluid flow control valve which includes a valve body having a chamber therein, an inlet passage communicating with said valve body chamber, and an outlet passage communicating with the valve body chamber. An annular seal is mounted in said valve body chamber, and a rotatable valve is operatively mounted in said valve body chamber in seating engagement with said annular seal. Said rotatable valve is provided with chamber means that is operatively connected with said inlet and outlet passages when the rotatable valve is turned to an open position, and means releasably connected thereto for rotating said rotatable valve to a first position to permit flow of fluid from said inlet passage and through said rotatable valve chamber means to said outlet passage, and to a second position, whereby the flow of fluid between the inlet passage and the outlet passage is blocked by said rotatable valve, and means for retaining said rotatable valve in a closed position.

Other features and advantages of this invention will be apparent from the following detailed description, appended claims, and the accompanying drawings.

BRIEF DESCRIPTION OF THE DRAWINGS

FIG. 1 is an elevational section view of an illustrative embodiment of a fluid flow control made in accordance with the principles of the present invention.

FIG. 2 is a horizontal, section view of the valve structure illustrated in FIG. 1, taken along the line 2—2 thereof, with the dividing wall removed, looking in the direction of the arrows, and showing a rotatable manual control handle disposed in an open position to allow flow through the valve.

FIG. 3 is a horizontal, section view, similar to FIG. 2 of the structure of FIG. 1, and showing the rotatable manual control handle turned to a closed position to stop fluid flow through the valve.

FIG. 4 is a fragmentary, bottom plan view of the structure illustrated in FIG. 1, taken along the line 4—4 thereof, and looking in the direction of the arrows.

FIG. 5 is a fragmentary, elevational view of the structure illustrated in FIG. 4, taken along the line 5—5 thereof, and looking in the direction of the arrow.

FIG. 6 is an elevational, section view, similar to FIG. 1, of a valve made in accordance with the principles of the present invention and showing a modified embodiment wherein the internal, dividing horizontal wall within the rotatable valve is eliminated.

DESCRIPTION OF THE PREFERRED EMBODIMENTS

Figure 7:
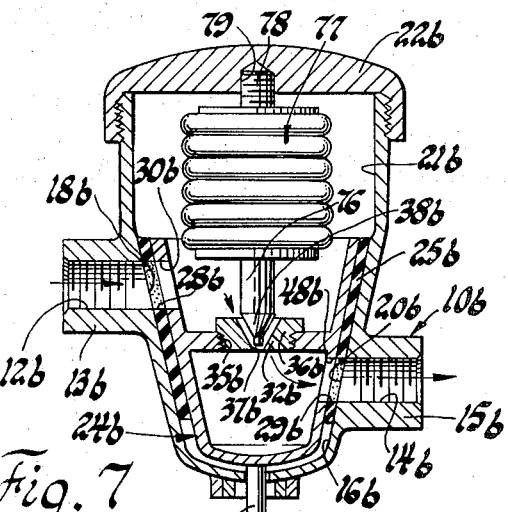
FIG. 7 is an elevational section view, similar to FIG. 1, and showing a slight modification of the configuration of the internal dividing horizontal wall within the rotatable valve structure.

Referring now to the drawings, and in particular to FIGS. 1 through 5, the numeral 10 generally designates an illustrative fluid flow control valve made in accordance with the principles of the present invention. The valve 10 comprises a valve body 11 which is cup-shaped on the lower end thereof and cylindrical on the upper end thereof. The valve body 11 is provided with a threaded bore or inlet passage 12 formed through an integral lateral extension housing 13 on one side of the valve body 11. The inlet passage 12 comprises the high pressure side of the valve. The valve 10 is also provided with a threaded bore or outlet passage 14 formed through an integral, lateral extension housing 15 on the opposite side of the body 11 and at a position diametrically opposite the inlet housing 13.

As shown in FIG. 1, the lower end of the valve body 11 is cup-shaped and is provided with an internal chamber 16 which has an upwardly and outwardly sloping inner wall surface which diverges upwardly. The inlet passage 12 communicates with the cahamber 16 through a passage 17 and an inlet port 18. The outlet passage 14 also communicates with the chamber 16 through a passage 19 and an outlet port 20. The upper end of the valve body 11 is cylindrical and has a cylindrical chamber 21 which communicates with the cup-shaped chamber 16.

The upper end of the valve body 11 is enclosed by a suitable top end cover plate 22 which is threadably mounted on the upper end of the valve body 11. The flow of fluid between the inlet passage 12 and the outlet passage 14 is controlled by a rotatable valve generally indicated by the numeral 24 and illustrated as having a wedge-shaped or inverted cone-shaped body. The rotatable valve 24 could also be said to have a cup-shaped body. A circular, cylindrical valve seal 25 is operatively positioned around the rotatable valve 24. The valve 24 is seated on the inner face of the seal 25 which is shaped to rotatably receive the wedge-shaped surface of the rotatable valve 24.

As shown in FIG. 2, the valve body 11 is provided with a pair of diametrically opposite disposed vertical grooves 26 in each of which is slidably mounted an integral, vertically extended tongue 27 formed on the outer face of the seal 25. The tongues 27 are mounted in the grooves to prevent rotation of the seal 25. As shown in FIGS. 1, 2 and 3, the seal 25 is provided with an inlet opening 28 which is aligned with the inlet port 18. The seal 25 is also provided with an outlet opening 29 which is aligned with the outlet port 20. As shown in FIG. 1, the seal 25 is wedge-shaped and the valve 24 is adapted to be mounted inside of the seal 25 by sliding the same downwardly into the position shown in FIG. 1.

As shown in FIGS. 1, 2 and 3, the rotatable valve 24 is provided with an inlet port 30 that communicates with the seal opening 28 and the valve inlet port 18. The rotatable valve 24 is also provided with an inlet chamber or passage 31 which communicates with the inlet port 30. The rotatable valve 24 is provided with an internal, horizontal dividing chamber wall portion 32 which is integrally connected to an upwardly angled, integral wall portion 33 that has its outer end integrally attached to the inner top edge of the rotatable valve. The wall portion 32 is also integrally attached to a downwardly angled outer dividing wall portion 34 which is integrally attached to the inner wall of the rotatable valve 24 at a point below the level of the opening 29 through the seal 25.

The dividing wall portion 32 is provided with a threaded opening 35 in which is threadably mounted a valve seat collar 36 through which is formed an inlet port 37 for a valve outlet chamber 47 formed in the upper end of the rotatable valve 24. A conically shaped valve seat is formed at the upper end of the inlet port 37 and it operatively receives a cone-shaped regulating valve element 38. The valve outlet chamber 47 communicates with the outlet passage 14 through an outlet port 48. The valve element 38 is cone-shaped and the mating valve seat is also cone-shaped. The valve element 38 is adapted to control the flow of fluid through the port 37.

The valve element 38 is provided with an upwardly extended conventional valve stem 39 which has its lower end operatively attached to the valve element 38 by any suitable means as by a threaded nut 45, as shown in FIG. 1. The valve stem 39 is adapted to move the valve 38 element between the closed solid line position shown in FIG. 1 and the open position as shown by the dotted lines and indicated by the numeral 44. As shown in FIG. 1, the valve operating stem 39 extends upwardly through a hole 40 in a top cover plage 42 and through a packing chamber 41 in which is operatively mounted suitable valve packing 42 that is secured in place by a threadably mounted packing collar 43. It will be understood that the valve stem 39 may be operatively connected to any suitable type of operator, for example, a bellows type operator as shown in U.S. Pat. No. 3,493,008, or a conventional diaphragm or motor operated device.

The rotatable valve 24 is provided with an integral, downwardly extended lower end shaft 49 which extends through a hole 50 formed in the lower end of the valve body 11. The shaft or rod 49 extends downwardly through a packing chamber 51 in which is operatively mounted valve packing 52 that is secured in place by a threadably mounted packing collar 53. The lower outer end 54 of the shaft 49 is threaded and it is adapted to have mounted thereon a valve turning means 55 in the form of an elongated operating handle. The handle 55 is provided with a suitable opening through which is extended the shaft 54. A nut 56 operatively retains the handle 55 in a locked position against the outer surface of the packing collar 53. As shown in FIGS. 1 and 2, when the valve operating handle 55 is in the position shown therein, it is in alignment with the inlet and outlet passages 12 and 14, respectively, and the rotatable valve 24 is disposed in the open position to allow fluid flow through the valve 10. In order to turn the rotatable valve 24 to the closed position, the handle 55 is moved 90° counterclockwise, as viewed in FIGS. 2 and 3, to the position shown in FIG. 3.

As shown in FIGS. 1, 4 and 5, the operating handle 55 is provided with a pair of integral, upwardly extended cam fingers 59 and 60 which abut downwardly extended stops 63 and 64, respectively, when the handle 55 is turned to the open position of FIGS. 1, 2 and 4. When the operating handle 55 is turned to the closed position of FIG. 3, the cam fingers 59 and 60 are moved to the broken line positions indicated by the numerals 67 and 68, respectively, so as to abut the stops 65 and 66. The outer axial end surfaces of the cam fingers 59 and 60 are slidably engaged against a pair of downwardly facing and sloping, arcuate cam surfaces 61 and 62, respectively, whereby when the operating lever 55 is turned from the open position of FIGS. 2 and 4, to the closed position of FIG. 3, the cam fingers will be cammed downwardly so as to provide a downward thrust on the rod 49 aned move the rotatable valve 24 downwardly into a locked position to firmly seat it on the seal 25, and thus prevent leakage when the rotatable valve 24 is in the closed position of FIG. 3. The last described cam means thus functions as a means for releasably retaining the rotatable valve 24 in an operative closed position in the seal 25.

In use, the valve structure illustrated in FIGS. 1 through 5 would be operatively mounted in a fluid flow system with the operating handle 55 disposed in the position shown in FIG. 1 to allow flow through the valve 10 from the upstream or high pressure inlet passage 12 to the downwstream or low pressure outlet passage 14. The regulating valve 38 would be operated by a suitable pressure or temperature regulation means or other suitable means. The fluid entering the inlet passage 12 would flow into the passage 17 and through the seal opening 28 and through the rotatable valve inlet port 30 and into the valve inlet chamber 31. Assuming the valve 38 is in the open position, the fluid would then pass through the inlet port 37 for the valve outlet chamber 47 and out through the outlet port 48, the seal opening 29, the passage 19 and out through the outlet passage 14. It will be seen that the inlet passage 12 is disposed in the valve body 11 at a point diametrically opposite to the outlet passage 14 so that the fluid passes into the rotatable valve 24 and thence downwardly and upwardly and through the dividing wall, and thence downwardly and out through the outlet passage 14 so as to follow a substantially S-shaped path through the valve.

It will be seen that the valve top end cover 22 can be quickly and easily removed for the purpose of cleaning the valve 10. The operating or turning handle 55 would be turned in a counterclockwise direction, as viewed in FIGS. 2 and 3, so as to move the rotatable valve 24 to a blocking position or closed position to block the flow of fluid through the valve 10. The valve 10 illustrated in the embodiments of FIGS. 1 through 5 thus provides the functions of a regulating valve and two shut-off valves in one unitary operating structure.

FIG. 6 illustrates a second embodiment of the invention which provides a novel and improved fluid flow control valve that is adapted to provide the functions of a flow switch or flow indicator and two shut-off valves in one unitary operating structure. The parts of the embodiment of FIG. 6 which are the same as the corresponding parts of the embodiment of FIGS. 1 through 5 are marked with the same reference numerals followed by the small letter a. The embodiment of FIG. 6 is adapted to be provided with the same turning handle and cam locking structure as illustrated in the embodiment of FIGS. 1 through 5.

As shown in FIG. 6, the rotatable valve 24a is not provided with any dividing wall therein so as to divide the internal chamber into two chambers. Accordingly, the fluid is allowed to flow straight through the rotatable valve 24a from the inlet passage 12a to the outlet passage 14 a. In lieu of a regulating valve, the embodiment of FIG. 6 is provided with a conventional flow switch or flow indicator mechanism generally indicated by the numeral 71 which is operatively attached by any suitable means to the cover plate 22a. The conventional flow switch mechanism 71 has a rod 74 extended downwardly through a suitable opening in the cover plate 22a and it carries a pivot mechanism 73 to which is operatively mounted a flow lever 72. Flow of fluid through the valve forces the lever 72 to the dotted line position 75 and the flow mechanism 71 operatively initiates an electrical flow signal which can be converted to a visual reading on a suitable electric meter. Details of the flow switch mechanism 71 have not been shown since such mechanisms are conventional and readily available on the market. It will be seen that the embodiment of FIG. 6 thus provides a novel and improved fluid flow control valve which is adapted to provide the functions of a flow switch or flow indicator and two shut-off valves in one unitary operating structure.

FIG. 7 illustrates another embodiment of the invention wherein the regulating means is removed and a trap means is added. The parts of the embodiment of FIG. 7, which are the same as the first embodiment of FIGS. 1 through 5, have been marked with the same reference numerals followed by the small letter b.

In the embodiment of FIG. 7, the regulating means has been deleted in lieu of a trap means. The dividing wall inside of the rotatable valve 24b has also been changed to a completely horizontal wall which is vertically spaced between the inlet passage 12b and the outlet passage 14b. It will be seen that the outlet passage 14b is disposed downwardly but parallel to the inlet passage 12b. The trap valve 38b is carried by a shaft 76 which is operatively connected to a bellows 77 which is provided on its upper end with a threaded shaft 78 that is threadably mounted in the threaded bore 79 formed on the inner side of the cover 22b. The thermostatic trap structure 77 is a standard conventional structure, and any suitable commercially available structure of this type may be employed.

Figure 8:
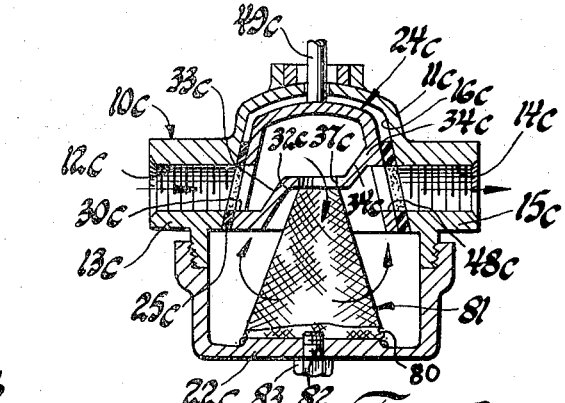
FIG. 8 is an elevational section view, similar to FIG. 1, and showing another embodiment of the invention in an inverted position, and provided with a strainer function in lieu of a regulating function.

FIG. 8 illustrates another embodiment of the invention wherein the regulator means is removed and a strainer means is added. The parts of the embodiment of FIG. 8 which are the same as the first embodiment of FIGS. 1 through 5 have been marked with the same reference numerals followed by the small letter c.

In the embodiment of FIG. 8, the valve body 10c is inverted and a conically shaped strainer, generally indicated by the numeral 81, is operatively mounted inside of the valve body between the cover 22c and the dividing wall portion 32c. The small end of the strainer 81 is disposed adjacent the port 37c and its lower and larger end is disposed around an inwardly extended circular shoulder 80. The flow through the valve structure of FIG. 8 is from left to right, as indicated by the arrows in FIG. 8. The sediment collected in the inverted cover 22c is adapted to be drained out through a drain hole 82 which is normally closed by a suitable threadably mounted drain plug 83. The valve structure of FIG. 8 provides a novel and improved fluid flow control valve which is adapted to provide the functions of a strainer and two shut-off valves in one unitary operating structure.

Figure 9:
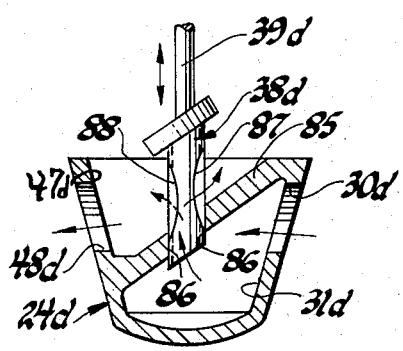
FIGS. 9 and 10 are elevational, section views of modified rotatable valve structures adapted to be used with the previously described embodiments of FIGS. 1 through 7, and showing slight modifications to the configurations of the internal dividing wall within the rotatable valve structure.

FIG. 9 illustrates a modified rotatable valve structure adapted to be used with the embodiments of FIGS. 1 through 7, and showing a modification to the configuration of the internal dividing wall and the valve element. The parts of the embodiment of FIG. 9 which are the same as the first embodiment of FIGS. 1 through 5 have been marked with the same reference numerals followed by the small letter d. In the rotatable valve illustrated in FIG. 9, the dividing wall 85 is formed at an angle so that its upper end starts at a point above the inlet port 30d and terminates at a point below the outlet port 48d. The valve element 38d is cylindrical and elongated and is provided with a vertically extended passage 86 which opens to the chamber 31. The passage 86 communicates with outlet ports 87 and 88 at a point above the dividing wall 85 when the valve element 38d is in the raised position, as illustrated in FIG. 9. When the valve element 38d is in the lowered position, the ports 87 and 88 will be closed.

Figure 10:
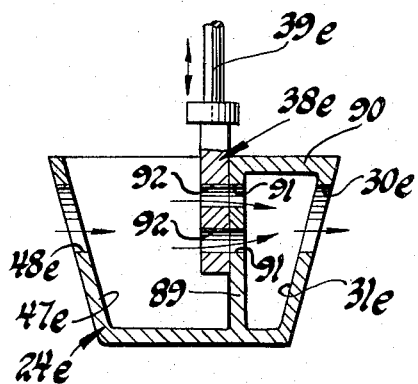

FIG. 10 is an elevational section view of a modified rotatable valve structure adapted to be used with the embodiments of FIGS. 1 through 7, and showing a slight modification to the configuration of the internal dividing wall within the rotatable valve. The parts of the embodiment of FIG. 10 which are the same as the first embodiment of FIGS. 1 through 5 have been marked with the same reference numerals followed by the small letter e.

In the embodiment of FIG. 10, the rotatable valve 24e is provided with a vertical dividing wall 89 which is integral with the bottom wall of the valve. A second horizontal upper wall 90 encloses the chamber 31e. The valve element 38e comprises a flat gate-like valve which is provided with two ports 92 that communicate with two ports 91 through the dividing wall 89 when the valve is in the open position, as shown in FIG. 10. When the valve element 83e is moved downwardly to the closed position the ports 91 and 92 will be offset and flow is blocked through the ports 91.

Figure 11:
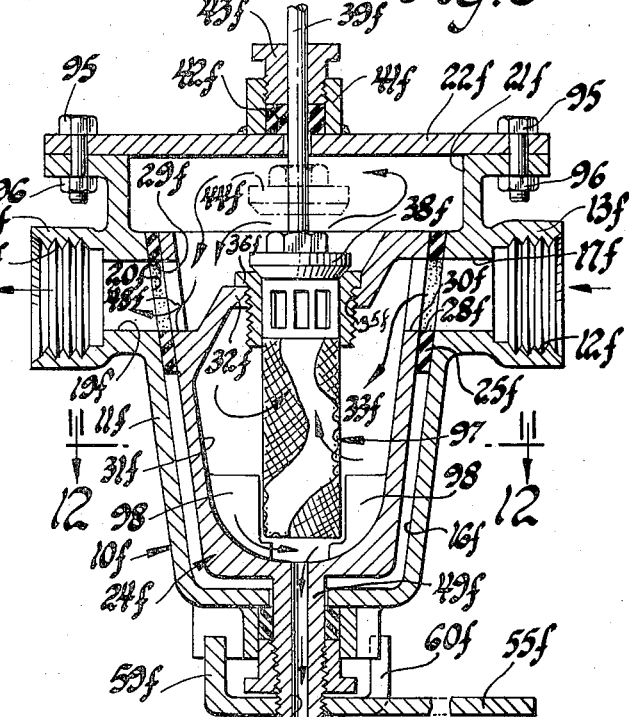
FIG. 11 is an elevational, section view, similar to FIG. 1, and showing a further embodiment which is provided with a strainer function within the rotatable valve structure.
Figure 12:
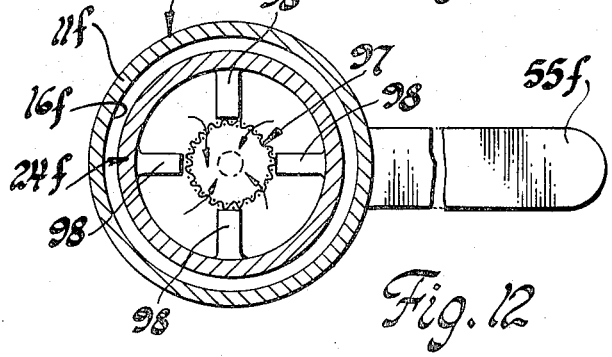
FIG. 12 is a horizontal, section view of the valve structure illustrated in FIG. 11, taken along the line 12—12 thereof, and looking in the direction of the arrows.

FIGS. 11 and 12 illustrate another embodiment of the invention wherein the valve is provided with a regulating means and a strainer means within the rotatable valve structure. The parts of the embodiment of FIGS. 11 and 12 which are the same as the first embodiment of FIGS. 1 through 5 have been marked with the same reference numerals followed by the small letter f. The valve structure of FIGS. 11 and 12 is similar to the valve structure of FIG. 1 except the cover element 22f is shown as a plate which is secured to the valve body 11f by a plurality of suitable bolts 95 and nuts 96.

The valve body 11f is elongated and a strainer, generally indicated by the numeral 97, is operatively mounted in the valve body with its upper end provided with a plurality of slots and seated in the outlet port 33f. The strainer 97 is made from any suitable conventional strainer material. The lower end is seated between a plurality of vertically disposed flanges or guide members 98 which are integrally formed on the inner side of the chamber 31f of the rotatable valve 24f. The turning rod 49f is provided with a drain passage 99 therethrough which is closed at the lower end by a suitable threadably mounted drain plug 100. The valve illustrated in FIGS. 11 and 12 functions in the same manner as the valve of the embodiment of FIGS. 1 through 5, but with the added strainer and sediment collection function. The lower end of the elongated chamber 31f in the rotatable valve 24f functions as a sediment collection chamber.

Figure 13:
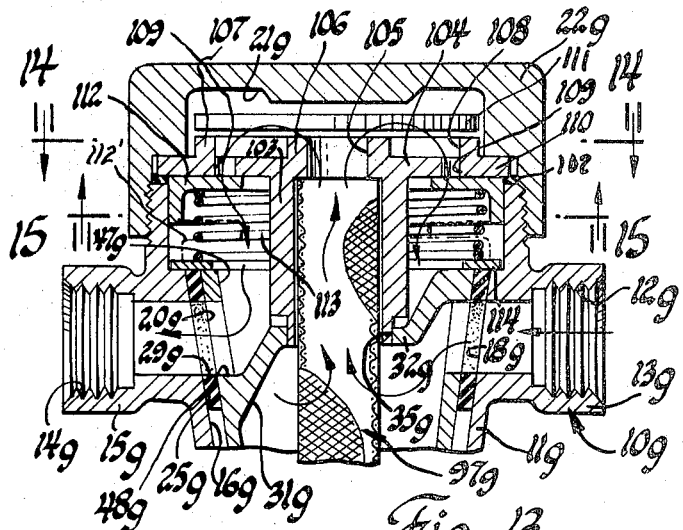
FIG. 13 is a fragmentary, elevational section view of a further embodiment of the invention, and showing the rotatable valve structure of the present invention provided with a strainer function within the rotatable valve structure, a trap feature illustrated by a conventional thermodynamic disc, and a check valve structure within the valve body.
Figure 14:
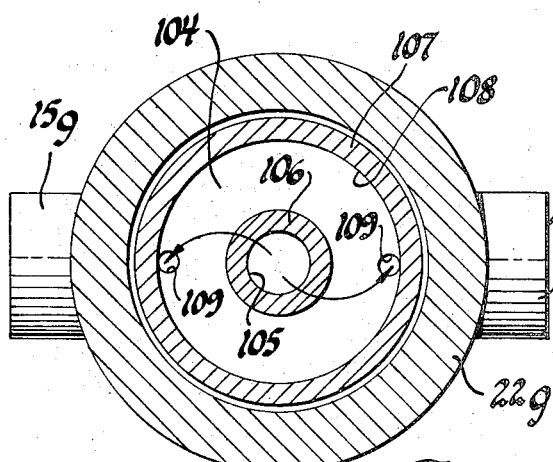
FIG. 14 is a horizontal, section view of the valve structure illustrated in FIG. 13, taken along the line 14—14 thereof, and looking in the direction of the arrows.
Figure 15:
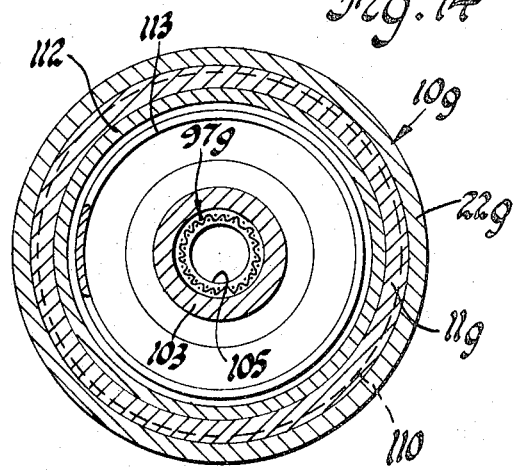
FIG. 15 is a horizontal section view of the valve structure illustrated in FIG. 13, taken along the line 15—15 thereof, and looking in the direction of the arrows.

FIGS. 13, 14 and 15 illustrate a further embodiment of the invention wherein the regulating means is replaced by a trap means, such as a standard thermodynamic disc. The parts of the embodiment of FIGS. 13 through 15 which are the same as the first embodiment of FIGS. 1 through 5 have been marked with the same reference numerals followed by the small letter g. The valve of FIG. 13 includes a vertically extended cylindrical member 103 which is rotatably seated in the opening 35g in the dividing wall portion 32g. The upper end of the strainer 97g extends into the member 103. The valve of FIG. 13 may be provided on its lower end with a similar drain and strainer supporting structure as shown in FIG. 11.

An integral flange 104 is perpendicularly formed on the upper end of the cylindrical member 103, and a passage or bore 105 is formed therethrough which communicates with the bore through the cylindrical member 103. A circular axial flange 106 is formed around the upper end of the bore 105, and a second circular axial flange 107 is integrally formed on the upper side of the plate 104 in a radially spaced apart position, as best seen in FIG. 14. A circular passage 108 is formed between the upwardly extended flanges 106 and 107. As shown in FIG. 14, a pair of holes or ports 109 connect the passage 108 with the upper end 21g of the valve body chamber, and the rotatable valve outlet chamber 47g and the outlet passage 14g.

The outer end of the plate 104 includes the peripheral flange 110 which is seated under a shoulder on the cap 22g and held in place on the annular seal 102 when the cap 22g is threaded in position on the valve body 11g. A check valve in the form of an annular flange 112 is slidably mounted in the valve body 11g below the ports 109. A coil spring 113 normally biases the check valve 112 upwardly to the closed position against the bottom of the ports 109. As shown in FIG. 13, the lower end of the spring is supported on a suitable flat washer 114 positioned in the upper end of the valve body 11g. A movable thermodynamic disc valve 111 is seated on the flanges 106 and 107. The valve of FIGS. 13 through 15 may be used in steam lines where both a shut-off function is desired and a trap function is desired.

In use, condensate and air flowing through the inlet passage 12g would pass through the rotatable valve inlet chamber 31g and the strainer 97g and up through the passage 105 and into the chamber 21g. This flow action lifts the disc 111 off the flanges 106 and 107 as shown in FIG. 13. The condensate then passes into the passage 108 and down through the ports 109 into the outlet chamber 47g and out through the outlet passage 14g. The pressurized flow of condensate coming down through the ports 109 forces the check valve 112 downwardly to an open position as 112'. The spring 113 prevents back-flow from the inlet passage 14g through the holes or ports 109. When steam reaches the disc 111, increased flow velocity across the lower face of the disc 111 reduces pressure at this point and increases pressure above the disc 111 and the disc 111 moves downwardly and seats against the flanges 106 and 107 to close off flow through the valve. The last mentioned trap structure is conventional. The embodiment of FIGS. 13 through 15 illustrates the valve structure of the present invention provided with a strainer function within a rotatable valve structure, a trap feature, and a check valve structure all within a unitary operating structure.

Figure 16:
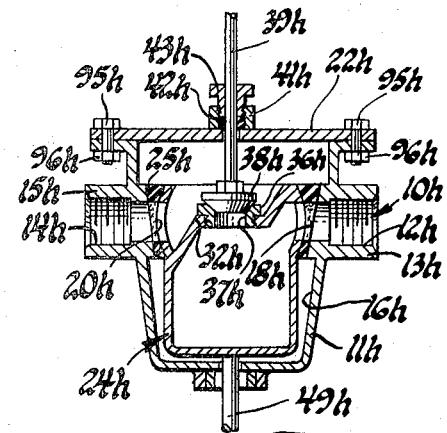
FIGS. 16, 17 and 18 are elevational, section views, with parts removed, of three different modifications of the fluid flow control valve structure illustrated in FIG. 1 and showing three different types of cylindrical, rotatable valve structures which may be used within the valve body of the invention in lieu of a wedge shaped valve.
Figure 17:
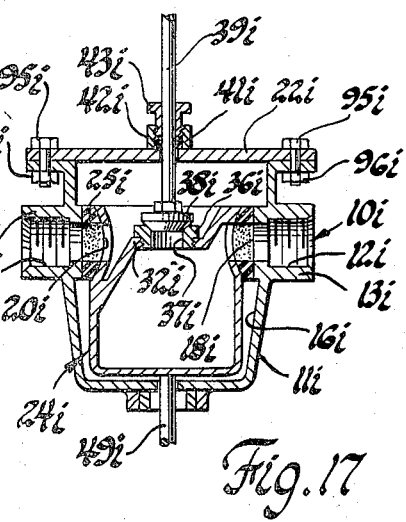
Figure 18:
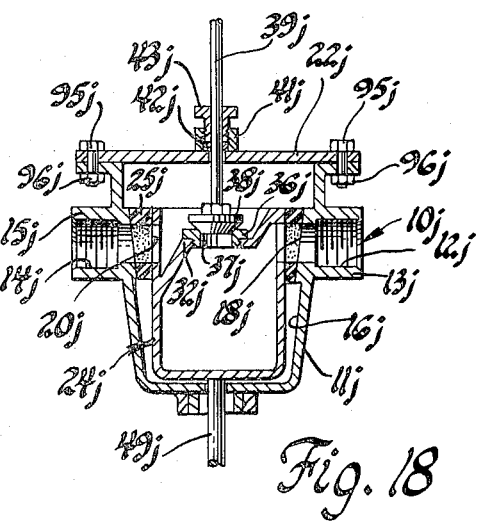

FIGS. 16, 17 and 18 illustrate three different modifications of the fluid flow control valve structure illustrated in FIG. 1, and these figures show three different types of cylindrical rotatable valve structure which may be used within the valve body of the invention. The parts of the embodiments of FIGS. 16, 17 and 18 which are the same as the first embodiment of FIGS. 1 through 5 have been marked with the same reference numerals followed by the small letters h, i, and j, respectively. FIG. 16 illustrates the upper end of the rotatable valve 24h being formed ball-shaped or convex outwardly and with a corresponding circular cylindrical mating seal 25h. FIG. 17 illustrates the forming of the upper end of the rotatable valve 24i with a concave outer valve surface and a circular cylindrical mating convex outer surface seal 25i. FIG. 18 illustrates the forming of the upper end of the rotatable valve structure 24j with a cylindrical form in lieu of the wedge-shape form shown in the embodiment of FIG. 1 and with a mating circular cylindrical wedge-shaped seal 25j.

It will be understood that all of the embodiments illustrated are provided with the turning handle structure illustrated in the embodiments of FIGS. 1 through 5 for turning the rotatable valves to the shut-off position.

While it will be apparent that the preferred embodiments of the invention herein disclosed are well calculated to fulfill the objects above stated, it will be appreciated that the invention is susceptible to modification, variation and change.

What I claim is:

1. A fluid flow control valve comprising:
   a. a valve body having a chamber therein;
   b. an inlet passage communicating with said valve body chamber and an outlet passage co-axially aligned with said inlet passage and communicating with said valve body chamber;
   c. a seal mens operatively mounted within said valve body chamber and being operative to seal around the inner ends of said inlet and outlet passages;
   d. a rotatable valve operatively mounted in said valve body chamber in sealing engagement with said seal means;
   e. means for holding said rotatable valve in a constant wedging and rotatable sealing relationship with said seal means in all positions of the rotatable valve on the seal means and during rotation of the rotatable valve;
   f. said rotatable valve being provided with a pair of chambers formed therein by a sloping dividing wall with one of said chambers comprising an inlet chamber having an inlet port communicating with said inlet passage and an outlet port in said sloping dividing wall communicating with the other of said pair of chambers which comprises an outlet chamber, and said outlet chamber having an outlet port co-axial with the inlet port of said inlet chamber and communicating with said outlet passage, whereby fluid entering said inlet passage will pass through said rotatable valve inlet chamber and into said rotatable valve outlet chamber and thence into said outlet passage;
   g. valve means operatively mounted in said valve body chamber above the rotatable valve for regulating the flow of fluid through the outlet port in said dividing wall from said valve body inlet chamber into said outlet passage;
   h. means mounted exteriorly on the lower end of the valve body in a position below the rotatable valve and releasably connected to said rotatable valve for rotating said rotatable valve to a first position to permit said flow of fluid from said inlet passage and through said rotatable valve to said outlet passage and to a second position whereby the flow of fluid between the inlet passage and outlet passage is blocked by said rotatable valve; and,
   i. said means for holding said rotatable valve in a rotatable sealing relationship with said seal including a cam means mounted exteriorly of the valve body and operatively attached to said means for rotating said rotatable valve by gradual inclination toward the seal means to retain the rotatable valve in a further wedged and locked position when it is rotated to said second position.

2. A fluid flow control valve as defined in claim 1, including:

a. a strainer means operatively mounted in the valve body and extending into the outlet chamber in said rotatable valve element to strain the fluid passing through the rotatable valve outlet chamber.

3. A fluid flow control valve as defined in claim 1, wherein:
a. said rotatable valve has longitudinal convex sides at the portion thereof which operatively engages said seal means.

4. A fluid flow control valve as defined in claim 1, wherein:
a. said rotatable valve has longitudinal concave sides at the portion thereof which operatively engages said seal means.

5. A fluid flow control valve as defined in claim 1, wherein:
a. a strainer means is operatively mounted in the inlet chamber of said rotatable valve for straining fluid passing through said inlet chamber.

6. A fluid flow control valve as defined in claim 1, wherein:
a. a thermodynamically operable trap valve means is operatively mounted in the flow system between the inlet chamber and the outlet chamber in said rotatable valve.

7. A fluid flow control valve as defined in claim 1, wherein:
a. a regulating valve means is operatively mounted in the outlet port communicating the inlet chamber in said rotatable valve with the outlet chamber in said rotatable valve.

* * * * *